(12) United States Patent
Chen et al.

(10) Patent No.: US 8,279,358 B2
(45) Date of Patent: Oct. 2, 2012

(54) COMPLEX IMAGE DISPLAY DEVICE

(75) Inventors: Cheng-Huan Chen, Hsinchu (TW); Po-Hung Yao, Hsinchu (TW); Ya-Yu Nieh, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 455 days.

(21) Appl. No.: 12/638,398

(22) Filed: Dec. 15, 2009

(65) Prior Publication Data
US 2010/0182516 A1    Jul. 22, 2010

(30) Foreign Application Priority Data

Jan. 20, 2009 (TW) .............................. 98102086 A

(51) Int. Cl.
*H04N 5/74* (2006.01)

(52) U.S. Cl. .......................... 348/776; 348/739; 348/744

(58) Field of Classification Search .................. 348/744, 348/739, 776, 742–743, 771, 759–761; 353/31, 353/121–122, 34; *H04N 5/74*
See application file for complete search history.

(56) References Cited

U.S. PATENT DOCUMENTS

| | | | | | |
|---|---|---|---|---|---|
| 5,357,288 | A | * | 10/1994 | Hiroshima et al. | 348/742 |
| 5,917,558 | A | * | 6/1999 | Stanton | 348/743 |
| 6,583,940 | B2 | * | 6/2003 | Nishikawa et al. | 359/738 |
| 6,862,047 | B2 | * | 3/2005 | Hibi | 348/743 |
| 6,952,241 | B2 | * | 10/2005 | Ouchi et al. | 348/742 |
| 2009/0268102 | A1 | * | 10/2009 | Barazza | 348/744 |

* cited by examiner

*Primary Examiner* — Trang U Tran

(57) ABSTRACT

A complex image display device comprises a light source, an illumination optical module, a micro display module, at least one optical projection module, at least one image-light-path switch module, an image-light-path control unit, and at least one image display screen, wherein the light source provides a light beam, the illumination optical module receives and shapes the light beam, continuously the light beam is projected by the illumination optical module. The micro display module provides an image-to-be-displayed and the light beam is then modulated by the image to become at least an image-modulated light beam for displaying. Then, the optical projection module receives and magnifies the image-modulated light beam. Continuously, the image-light-path switch module receives the magnified image-modulated light beam and switches the light path of the light beam. The image display screen, thus, receives and displays the magnified image-modulated light beam, which is switched by the image-light-path switch module.

9 Claims, 5 Drawing Sheets

COMPLEX IMAGE DISPLAY DEVICE

CROSS-REFERENCE TO RELATED APPLICATION

This application claims foreign priority from a Taiwan Patent Application, Ser. No. 098102086, filed on Jan. 20, 2009.

BACKGROUND OF THE INVENTION

1. Field of the Invention

The present invention generally relates to a complex image display device and system, more particularly, an image display screen and system enabling images to be simultaneously displayed on a flat display screen, a rear-projection display screen and/or a front-projection display screen.

2. Description of the Prior Art

With the hi-tech development and high standards of living in modern life, an image display device has become one of the most important household equipments to provide leisure entertainment. The developments of image display devices have been continuously advanced, such as CRT displays, flat panel displays, rear project displays, LCD display, plasma display panel, high-resolution LCD, Liquid Crystal On Silicon (LCoS), Digital Light Projector (DLP), etc.; the display quality has been improved, in addition, the screen size is expanded such as 28", 32" 50" and 70".

Currently, the audience at home still uses flat display devices, such as LCD, plasma TV set and high-resolution LCD or rear-projection display device in a bright environment to enjoy TV or other entertainment programs.

For those movies that require bigger size screens are positioned at a certain distance, we usually apply a front-projection display device and the corresponding display screen to project videos in a bigger display environment.

Moreover, the laptop computers have been popularized for work or entertainment; however, the screen size is not convenient for business presentation. Therefore, a laptop computer must work together with a projector to perform a business presentation to increase additional value and benefit.

In view of the foregoing point of views, the invention provides a complex image display device and system, enabling images to be simultaneously displayed on a flat display screen, a rear-projection display screen and/or a front-projection display screen through the change and switch of the light path of the light beam or the image-modulated light beam without additional display devices required, therefore, the complex image display device and system enables the audience to switch desired image display mode by personal preference or needs.

SUMMARY OF THE INVENTION

In view of the aforementioned disadvantages and problems of the prior art, the primary objective of the present invention is to provide a complex image display device and system, more particularly, an image display screen and system that enables image displays to be switched on a flat display screen, a rear-projection display screen or a front-projection display screen for the specific display mode based on the audience preference and needs.

The complex image display device according to the present invention at least comprises a light source, an illumination optical module, a micro display device, at least one optical projection module, at least one image-light-path switch module, an image-light-path control unit and at least one display screen.

The light source is a Cold Cathode Fluorescent Lamp (CCFL), a Light Emitting Diode (LED), a light bulb or a laser light source to produce a light beam, and then, the illumination optical module receives, shapes and projects the light beam.

The micro display module is a Liquid Crystal On Silicon (LCoS), a Digital micro-Mirror Device (DMD) or a Grating Light Valve (GLV) to provide at least an image to be displayed; the image is then illuminated by the light beam from the illumination optical module to become a light beam with image information.

The optical projection module is either a prime lens set or a zoom lens set for receiving and magnifying the light beam with image to be displayed.

The image-light-path switch module receives the light beam with image information to be displayed from the projection optical module and switches the light path of the light beam; the image-light-path switch module is a mechanical rotary lens, a rotatable polarizer, a light-intensity splitting lens, a prism spectroscope, an active polarization or an intensity splitting component.

The image-light-path control unit connects the image-light-path switch module and controls the image-light-path switch module through either electric connection or mechanical connection to switch the light path of the light beam with image information.

The display screen is either a front-projection display screen or a rear-projection display screen to receive and to perform the image information, after the light path of the image is switched by the image-light-path switch module.

A complex image display device comprises a light source, at least a light-path switch module, a light-path control unit and at least two image display screens.

The light source is a Cold Cathode Fluorescent Lamp (CCFL), a Light Emitting Diode (LED), a light bulb or a laser light source to provide a luminance light beam. The light-path switch module is a mechanical rotary lens, a rotatable polarizer, a light-intensity splitting lens, a prism spectroscope, an active polarization or an intensity splitting component, to receive the light beam and switch the light path of the incident light beam. The image-light-path control unit controls the switches of light path of the light beam by the image-light-path switch module through either electric connection or mechanical connection.

The image display devices are applied to receive the light beam from the image-light-path switch module after the light path of the light beam is switched; the image display device is a flat image display device, a projection display device, a complex image display device or any two of the above combination; the flat image display device comprises at least a beam-uniformed shaper, a light-guide module and a flat panel display, in addition, the flat image display screen is an LCD display screen; the projection display device is either a front-projection display device or a rear-projection display device; the complex image display device comprises an optical illumination system, at least one optical projection module, at least one image-light-path switch module, an image-light-path control unit and at least one display screen.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

The present invention provides a complex image display device and system, enables an image-light-path switch module to switch the light path of an image-modulated light beam, so that the audience is able to switch the image display on a flat display, a rear-projection screen and/or a front-projection screen by personal preference and needs.

Figure 1:
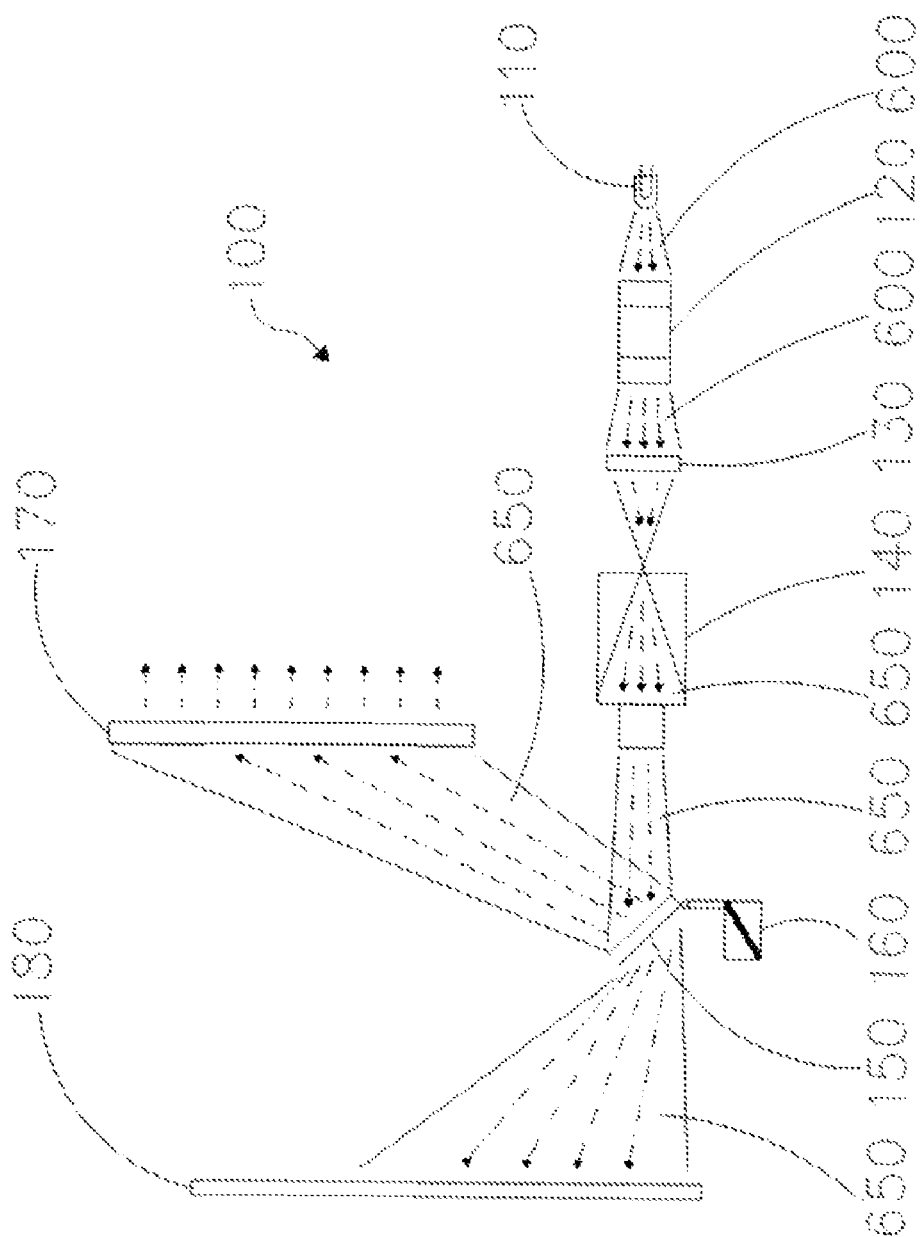
FIG. 1 illustrates a scheme view showing a first preferred embodiment of a complex image display device and system according to the invention.

The invention will become apparent in the following description taken in conjunction with the following drawings. With reference to FIG. 1, a complex image display device 100 comprises a light source 110, an illumination optical module 120, a micro display module 130, an optical projection module 140, an image-light-path switch module 150, an image-light-path control unit 160, a rear-projection display screen 170 and a front-projection display screen 180.

The light source is a Cold Cathode Fluorescent Lamp (CCFL), a Light Emitting Diode (LED), a light bulb or a laser light source; as shown in the drawing that the light source 110 provides a luminance light beam 600 and the illumination optical module 120 receives the light beam 600, and then, shapes and projects the light beam 600 to the micro display module 130.

The micro display module 130 is a Liquid Crystal On Silicon (LCoS), a Digital micro-Mirror Device (DMD) or a Grating Light Valve (GLV), as an image source to provide an image signal, subsequently, the light beam 600 projected by the illumination optical module 120 is then transformed into a light beam with image 650, the optical illumination module 120 outputs the light beam with image 650 to the optical projection module 140.

The optical projection module 140 is a prime lens set or a zoom lens set to receive the light beam with image 650 from the micro display module 130, magnifying the light beam with image 650, and then projecting the light beam on the rear-projection display screen 170 or the front-projection display screen 180.

The image-light-path switch module 150 is disposed on the light path to receive and switch the light path of the light beam with image 650 from the optical projection module 140; the image-light-path switch module 150 is composed of one or a plurality of mechanical rotary lens(es), rotatable polarizer(s), light-intensity splitting lens(es) prism spectroscope(s), active polarization or intensity splitting component(s). The image-light-path control unit 160 connects the image-light-path switch module 150 and controls the image-light-path switch module 150 to change the path of the light beam with image 650 by electric connection or mechanical connection.

Figure 2:
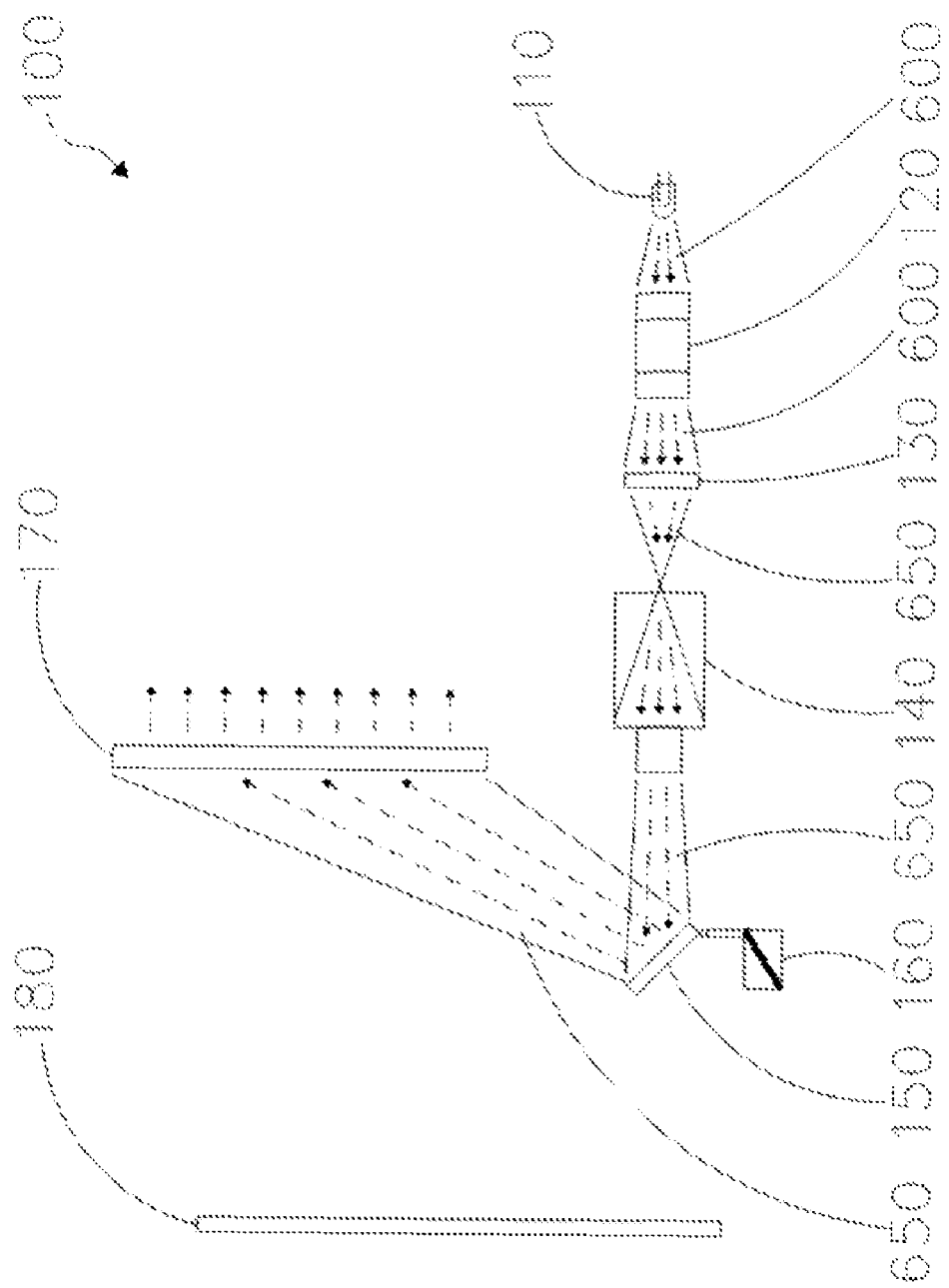
FIG. 2 illustrates a light path diagram (I) according to the first preferred embodiment of the present invention.

With reference to FIG. 2, when the image-light-path control unit 160 of the complex image display device 100 controls the image-light-path switch module 150 to switch the image to be displayed on the rear-projection display screen 170, the light beam with image 650 is switched to the rear-projection display screen 170 for display, the rear-projection display screen 170 is either a polymer screen or a hollow light-guide screen.

Figure 3:
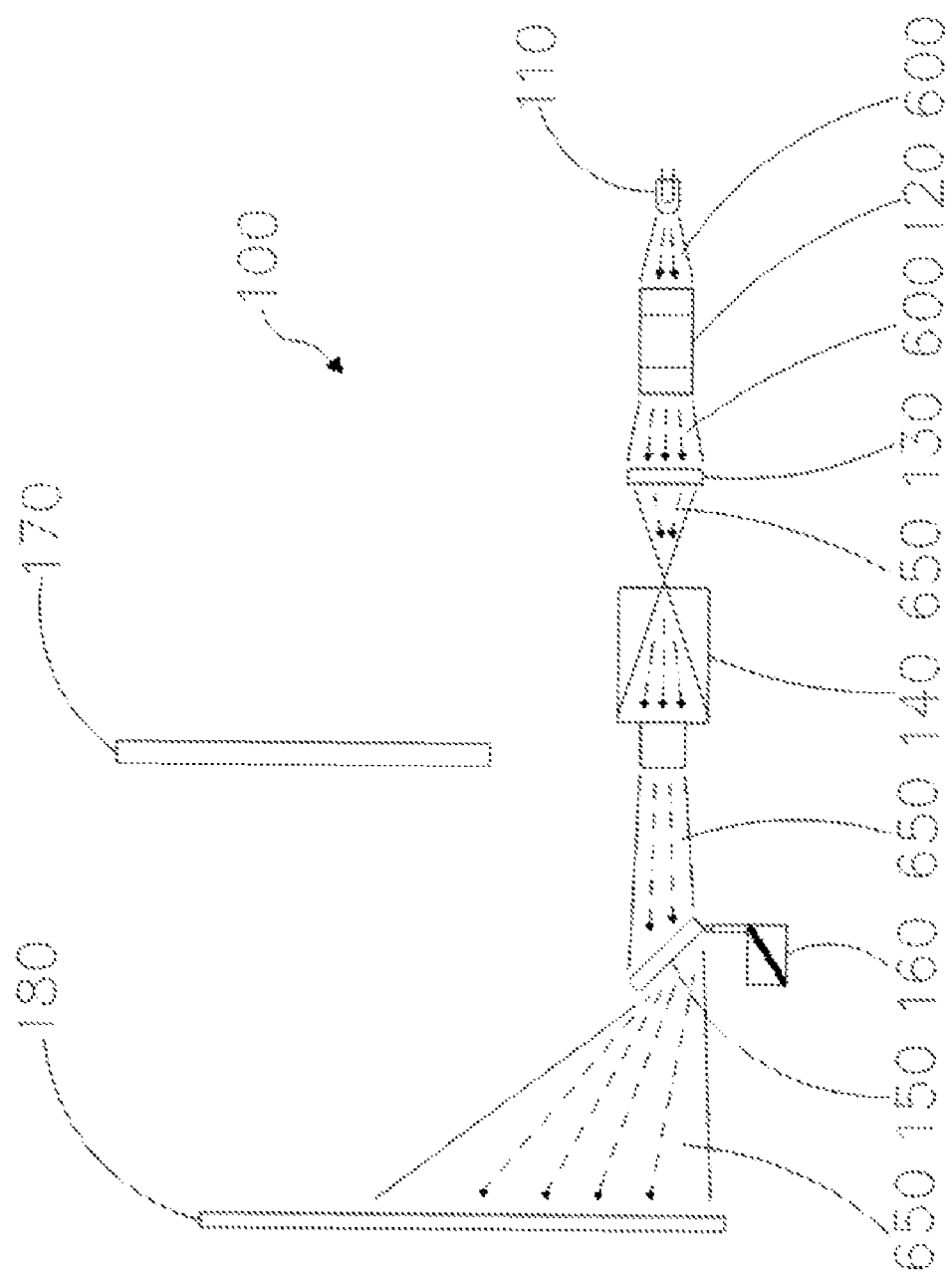
FIG. 3 illustrates a light path diagram (II) according to the first preferred embodiment of the present invention.

With reference to FIG. 3, when the image-light-path control unit 160 of the complex image display device 100 controls the image-light-path switch module 150 to switch the image to be displayed on the front-projection display screen 180, the light beam with image 650 is switched to the front-projection display screen 180 for display, the front-projection display screen 180 is a conventional front-projection display screen for image projection in front of the audience.

In addition, as shown in FIG. 1, the light beam with image 650 in the complex image display device 100 is able to be outputted to both of the rear-projection display screen 170 and the front-projection display screen 180 through controlling the image-light-path switch module 150 by the image-light-path control unit 160, therefore, the light beam with image 650 is able to be transmitted to both of the rear-projection display screen 170 and the front-projection display screen 180 for display.

Figure 4:
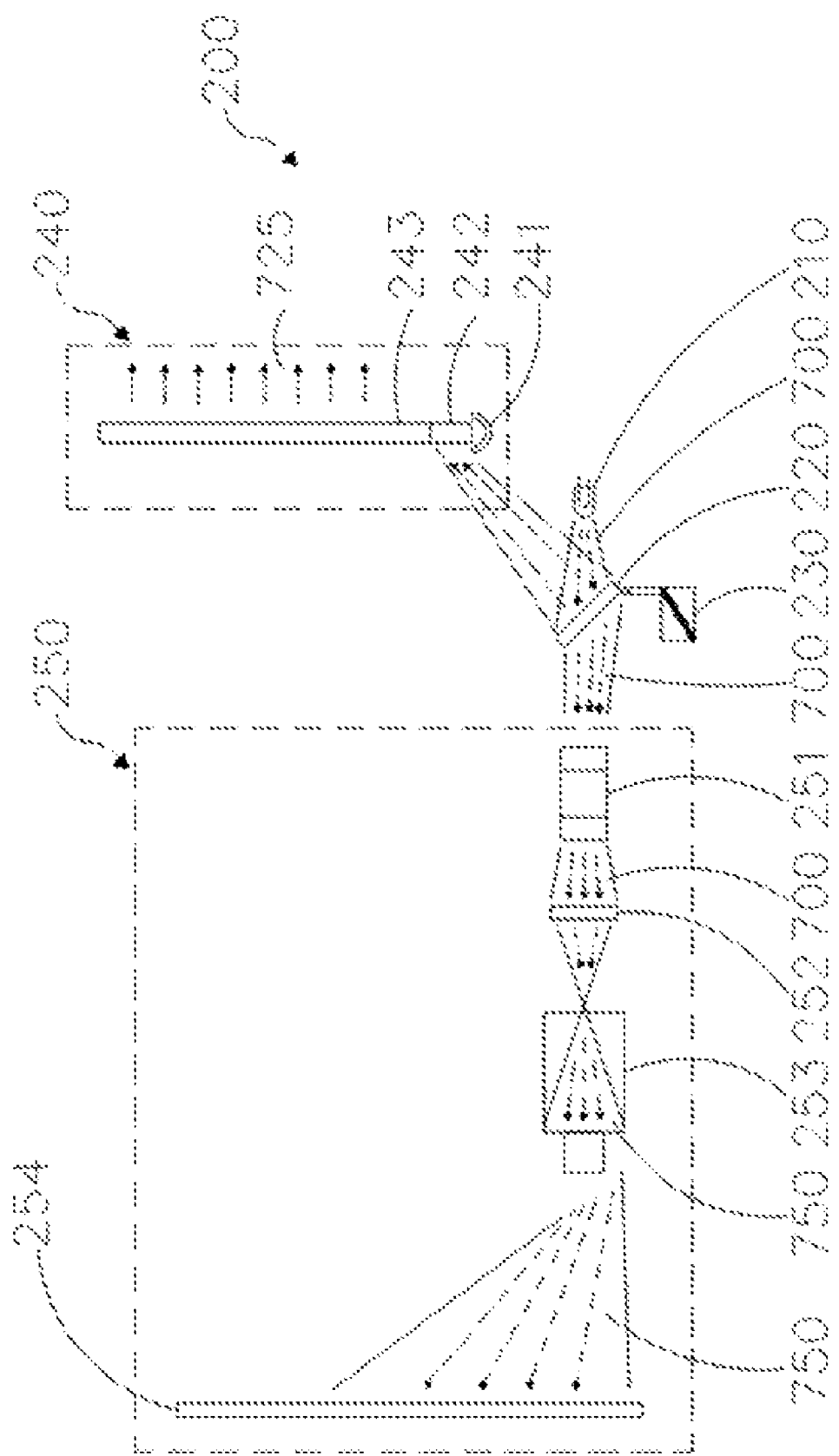
FIG. 4 is a scheme view showing a second preferred embodiment of a complex image display device and system according to the invention.

With reference to FIG. 4 of the second preferred embodiment according to the invention, a complex image display device 200 comprises a light source 210, a light-path switch module 220, a light-path control unit 230, a flat image display screen 240, and a projection display device 250.

The light source 210 is a Cold Cathode Fluorescent Lamp (CCFL), a Light Emitting Diode(LED), a light bulb or a laser light source to provide a luminance light beam 700. The light-path switch module 220 receives the luminance light beam 700 and is able to change the path of the luminance light beam 700 by applying one or a plurality of mechanical rotary lenses, rotatable polarizers, light-intensity splitting lenses, prism spectroscopes, active polarization or intensity splitting components.

The light-path control unit 230 connects the light-path switch module 220 through either electric connection or mechanical connection and controls the light-path switch module 220 to switch the path of the luminance light beam 700, enabling the luminance light beam 700 to be switched to be displayed on a flat image display screen 240, a projecting display device 250 or both of the display devices at the same time by personal preference or needs.

As shown in FIG. 4, the flat image display screen 240 is either an LCD display screen or other non-self-emitted display. The flat image display screen 240 comprises a beam-uniformed shaper 241, a light-guide module 242 and a flat panel display 243. When the light-path switch module 220 switches the luminance light beam 700 to the flat image display screen 240, the luminance light beam 700 is linearly shaped by the beam-uniformed shaper 241 and formed as a light beam 725 to be transmitted to the light-guide module 242, and then the uniform light beam 725 propagates in the light-guide module 242 and then is emitted out the light-guide module 242 to illuminate the flat panel display 243, subsequently, the flat panel display 243 provides image signals and applies conventional LCD technology to display the image.

The projection display device 250 is either a front-projection display device or a rear-projection display device. The projection display device 250 comprises an optical illumination module 251, a micro-display 252, an optical projection optical module 253 and a projection display screen 254; when the light-path switch module 220 switches the luminance light beam 700 to the projection display device 250, the luminance light beam 700 is evenly shaped by the optical illumination module 251 and outputted to the micro-display 252, and then the micro-display 252 adds an image signal into the luminance light beam 700 to transform the luminance light beam 700 to a light beam with image information 750, subsequently, the light beam with image 750 is outputted to the optical projection optical module 253 for image magnification and projected on the projection display screen 254 for display; in addition, the light-path control unit 230 controls the light-path switch module 220 to switch the luminance light beam 700 to both of the flat image display screen 240 and the projection display device 250 for display.

Figure 5:
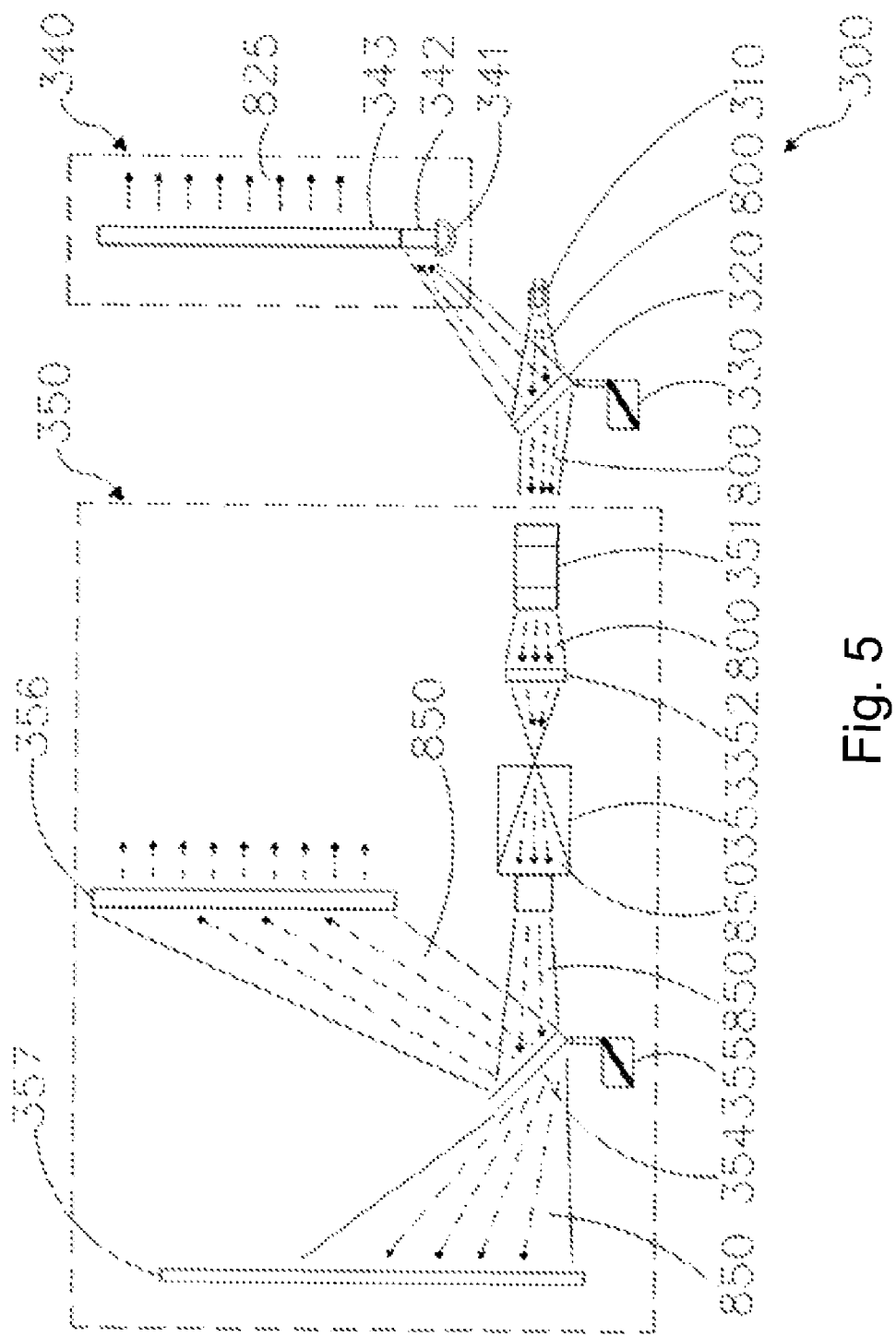
FIG. 5 is a scheme view showing a third preferred embodiment of a complex image display device and system according to the invention.

With reference to FIG. 5 of the third preferred embodiment according to the invention, a complex image display device 300 comprises a light source 310, a light-path switch module 320, a light-path control unit 330, a flat image display screen 340 and a complex image display device 350.

The light source 310 is a Cold Cathode Fluorescent Lamp (CCFL), a Light Emitting Diode (LED), a light bulb, or a laser light source to provide a luminance light beam 800. The light-path switch module 320 receives the luminance light beam 800 and switches the path of the luminance light beam 800 by applying one or a plurality of mechanical rotary lenses, rotatable polarizers, light-intensity splitting lens, prism spectroscopes, active polarization or an intensity splitting components.

The light-path control unit 330 connects the light-path switch module 320 and controls the light-path switch module 320 through either electric connection or mechanical connection to switch the path of the luminance light beam 800; therefore, the light path of the luminance light beam 800 is able to be switched to the flat image display screen 340, the complex image display device 350 or both of the devices for display by the audience's preference or needs.

The flat image display screen 340 is either an LCD display screen or other non-self-emitted display and comprises a beam-uniformed shaper 341, a light-guide module 342 and a flat panel display 343. When the light-path switch module 320 switches the luminance light beam 800 to the flat image display screen 340, the luminance light beam 800 is linearly shaped by the beam-uniformed shaper 341 and coupled in the light-guide module 342, subsequently, the light beam 825 is displayed with uniformity on the flat panel display 343; the flat panel display 343 provides image signals and applies conventional LCD technology to display the image.

The complex image display device 350 comprises a illumination optical module 351, a micro display module 352, a optical projection module 353, an image-light-path switch module 354, an image-light-path control unit 355, a rear-projection display screen 356 and a front-projection display screen 357.

The light-path switch module 320 switches and delivers the luminance light beam 800 to the complex image display device 350, the luminance light beam 800 is uniformly shaped by the illumination optical module 351 and outputted to the micro display module 352, the micro display module 352 adds an image signal to the luminance light beam 800 and transforms the luminance light beam 800 to a light beam with image 850, the light beam with imaged 850 is then outputted to the optical projection module 353 for image amplification and projected to both of the rear-projection display screen 356 and the front-projection display screen 357 for display. the image-light-path switch module 354 connects the image-light-path control unit 355 and acts among the optical projection module 353 and both of the rear-projection display screen 356 and the front-projection display screen 357; so that the image-light-path control unit 355 controls the image-light-path switch module 354 to switch the light path of the light beam with image 850, the light beam with image 850 is then displayed on the rear-projection display screen 356 or the front-projection display screen 357, or both of the devices at the same time.

The light-path control unit 330 is able to control the light-path switch module 320 to simultaneously project the luminance light beam 800 to the flat image display screen 340 and the complex image display device 350, the image-light-path switch module 354 of the complex image display device 350 is able to simultaneously project the light beam with image 850 to either the rear-projection display screen 356 or the front-projection display screen 357, consequently, the audience is able to switch images on a flat display screen, on a rear-projection display or on a front-projection display, or even allow the images to be simultaneously displayed on the above image display screens by personal preference or needs.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A complex image display device, comprising:
    a light source, providing a light beam;
    an illumination optical module, receiving the light beam and then projecting the light beam after being shaped;
    a micro display module, providing at least an image to be displayed, wherein the light beam is then modulated by the image to become at least an image-modulated light beam for displaying;
    at least an optical projection module, receiving and magnifying the image-modulated light beam;
    at least an image-light-path switch module, receiving the image-modulated light beam from the optical projection module and switching the light path of the magnified light beam;
    an image-light-path control unit, connecting the image-light-path switch module and controlling the switch of the light path of the image-modulated light beam by the image-light-path switch module; and
    at least an image display screen, receiving and displaying the image-modulated light beam, which is switched for the light path thereof by the image-light-path switch module, wherein the image display screen is selected from the group consisting of: a front-projection display screen and a rear-projection display screen.

2. The complex image display device according to claim 1, wherein the light source is selected from the group consisting of: a Cold Cathode Fluorescent Lamp (CCFL), a Light Emitting Diode (LED), a light bulb, and a laser light source.

3. The complex image display device according to claim 1, wherein the micro display module is selected from the group consisting of: a Cold Cathode Fluorescent Lamp (CCFL), a Light Emitting Diode(LED), a light bulb, and a laser light source.

4. The complex image display device according to claim 1, wherein the optical projection module is selected from the group consisting of: a prime lens set or a zoom lens set.

5. The complex image display device according to claim 1, wherein the image-light-path switch module is selected from the group consisting of: a mechanical rotary lens, a rotatable polarizer, a light-intensity splitting lens, a prism spectroscope, an active polarization, and an intensity splitting component.

6. The complex image display device according to claim 1, wherein the image-light-path control unit controls the image-light-path switch module through the ways of the group consisting of electric connection and mechanical connection.

7. The complex image display device according to claim 1, wherein the display screen is selected from the group consisting of: a polymer screen and a hollow light-guide screen.

8. The complex image display device according to claim 1, further comprising:
an image-light-path switch module, being disposed between the light source and the illumination optical module, and capable of receiving the light beam from the light source and switching the light path of the light beam;
an image-light-path control unit, connecting the image-light-path switch module and controlling the switch of the light path of the image-modulated light beam by the light-path switch module; and
an image display device, receiving and displaying the image-modulated light beam, which is switched the light path thereof by the image-light-path switch module.

9. The complex image display device according to claim 8, wherein the image display device comprises at least a beam-uniformed shaper, a light-guide module and a flat panel display.

* * * * *